(12) United States Patent
Okada et al.

(10) Patent No.: US 8,728,652 B2
(45) Date of Patent: May 20, 2014

(54) CYLINDRICAL ALKALINE BATTERY HAVING SPECIFIC ELECTRODE PACKING DENSITIES AND ELECTRODE THICKNESS

(75) Inventors: Tadaya Okada, Osaka (JP); Yasuhiko Syoji, Osaka (JP)

(73) Assignee: Panasonic Corporation, Osaka (JP)

( * ) Notice: Subject to any disclaimer, the term of this patent is extended or adjusted under 35 U.S.C. 154(b) by 74 days.

(21) Appl. No.: 13/140,658

(22) PCT Filed: Dec. 9, 2010

(86) PCT No.: PCT/JP2010/007158
§ 371 (c)(1),
(2), (4) Date: Jun. 17, 2011

(87) PCT Pub. No.: WO2012/049720
PCT Pub. Date: Apr. 19, 2012

(65) Prior Publication Data
US 2012/0094159 A1    Apr. 19, 2012

(30) Foreign Application Priority Data
Oct. 13, 2010 (JP) ................. 2010-230822

(51) Int. Cl.
*H01M 4/06* (2006.01)
*H01M 6/04* (2006.01)

(52) U.S. Cl.
USPC ............................ 429/165; 429/224; 429/229

(58) Field of Classification Search
CPC .................................. H01M 6/04; H01M 4/06
USPC ............................................. 429/122–347, 94
See application file for complete search history.

(56) References Cited

U.S. PATENT DOCUMENTS

| 5,283,139 | A | 2/1994 | Newman et al. |
| 6,251,539 | B1 | 6/2001 | Brys et al. |
| 6,294,287 | B1 * | 9/2001 | Lee et al. ............. 429/120 |
| 2001/0009741 | A1 * | 7/2001 | Durkot et al. ......... 429/229 |
| 2005/0227145 | A1 | 10/2005 | Iwamoto et al. |
| 2008/0085448 | A1 * | 4/2008 | Wada et al. ............ 429/128 |
| 2009/0263710 | A1 | 10/2009 | Kato et al. |
| 2009/0317711 | A1 | 12/2009 | Kato |

FOREIGN PATENT DOCUMENTS

| JP | 8-509095 | 9/1996 |
| JP | 2003-502808 | 1/2003 |
| JP | 2005-322613 | 11/2005 |
| JP | 2009-158257 | 7/2009 |
| JP | 2009-163982 | 7/2009 |
| JP | 2009-259706 | 11/2009 |
| JP | 2010-123319 | 6/2010 |
| WO | WO 94/24709 | 10/1994 |
| WO | WO 2010/058501 A1 | 5/2010 |

* cited by examiner

*Primary Examiner* — Jonathan G Leong
(74) *Attorney, Agent, or Firm* — McDermott Will & Emery LLP (57) ABSTRACT

Provided is a cylindrical alkaline battery in which the packing density Dc of the manganese dioxide in the positive electrode is 2.8 to 3.0 g/cm$^3$ and the packing density Da of zinc or a zinc alloy in the negative electrode is 2.0 to 2.3 g/cm$^3$. The packing density Dc of the manganese dioxide, the packing density Da of the zinc or zinc alloy, the thickness Tc of the positive electrode in a radial direction, and the thickness Ta of the negative electrode in a radial direction satisfy one of the following relational formulas (1) to (3):

$$-1.975 \times (Tc/Ta) + 2.745 < Dc/Da < -1.690 \times (Tc/Ta) + 2.734 \quad (1)$$

$$-11.652 \times (Tc/Ta)^2 + 14.470 \times (Tc/Ta) - 3.095 < Dc/Da < 11.652 \times (Tc/Ta)^2 - 18.420 \times (Tc/Ta) + 8.585 \quad (2)$$

$$-8.895 \times (Tc/Ta)^2 + 12.864 \times (Tc/Ta) - 3.258 < Dc/Da < 8.895 \times (Tc/Ta)^2 - 16.244 \times (Tc/Ta) + 8.726 \quad (3).$$

12 Claims, 2 Drawing Sheets

FIG. 5

CYLINDRICAL ALKALINE BATTERY HAVING SPECIFIC ELECTRODE PACKING DENSITIES AND ELECTRODE THICKNESS

RELATED APPLICATIONS

This application is the U.S. National Phase under 35 U.S.C. §371 of International Application No. PCT/JP2010/007158, filed on Dec. 9, 2010, which in turn claims the benefit of Japanese Application No. 2010-230822, filed on Oct. 13, 2010, the disclosures of which Applications are incorporated by reference herein.

TECHNICAL FIELD

This invention relates to cylindrical alkaline batteries, and more particularly to an improvement in the positive and negative electrodes thereof.

BACKGROUND ART

Cylindrical alkaline batteries are inexpensive dry batteries for use in a wide current range from a low load to a high load, and are widely used as the power source for electronic devices such as portable appliances. Thus, they are under active research and development to improve their discharge performance.

For example, PTL 1 proposes setting the packing density of zinc in the negative electrode to 1.6 g/cm³ or more, setting the packing density of manganese dioxide in the positive electrode to 2.8 g/cm³ or more, and setting the capacity density of each of the positive and negative electrodes to more than about 0.48 Ah/cm³.

PTL 2 proposes an AA size alkaline battery in which the packing density of graphite in the positive electrode is set to 0.12 to 0.23 and the ratio Tp/Tn of the thickness Tp of the positive electrode in the radial direction to the thickness Tn of the negative electrode in the radial direction is set to from 0.63 to 0.72, or from 0.67 to 0.77. When Tp/Tn is from 0.63 to 0.72, the high rate discharge characteristics improve, and when Tp/Tn is from 0.67 to 0.77, the low rate discharge characteristics improve.

CITATION LIST

Patent Literature

PTL 1: International Publication No. WO 94/024709
PTL 2: Japanese Laid-Open Patent Publication No. 2009-158257

SUMMARY OF INVENTION

Technical Problem

In PTL 1, the packing densities (active material amounts) of the electrodes are simply increased, and the conditions for producing the electrodes, such as how the packing densities of the electrodes are increased, are not sufficiently examined.

In PTL 2, the packing density of manganese dioxide in the positive electrode and the packing density of zinc in the negative electrode are not sufficiently examined.

Also, in PTLs 1 and 2, in the case of increasing the densities of the positive and negative electrodes, the balance between the positive and negative electrodes, such as the ratio of the packing densities of the positive and negative electrodes and the ratio of the thicknesses thereof in the radial direction, is not examined.

Solution to Problem

The invention relates to a cylindrical alkaline battery including: a cylindrical battery case with a bottom; a cylindrical positive electrode contained in the battery case, the positive electrode having a hollow and including manganese dioxide and graphite; a negative electrode packed in the hollow of the positive electrode, the negative electrode including zinc or a zinc alloy; a separator interposed between the positive electrode and the negative electrode; a negative electrode current collector rod inserted into the negative electrode; and an alkaline electrolyte. The packing density Dc of the manganese dioxide in the positive electrode is 2.8 to 3 g/cm³ and the packing density Da of the zinc or zinc alloy in the negative electrode is 2 to 2.3 g/cm³.

In an aspect of the invention, the packing density Dc of the manganese dioxide, the packing density Da of the zinc or zinc alloy, the thickness Tc of the positive electrode in the radial direction, and the thickness Ta of the negative electrode in the radial direction satisfy the relational formula (1):

$$-1.975 \times (Tc/Ta) + 2.745 < Dc/Da < -1.690 \times (Tc/Ta) + 2.734$$

In another aspect of the invention, the packing density Dc of the manganese dioxide, the packing density Da of the zinc or zinc alloy, the thickness Tc of the positive electrode in the radial direction, and the thickness Ta of the negative electrode in the radial direction satisfy the relational formula (2):

$$-11.652 \times (Tc/Ta)^2 + 14.470 \times (Tc/Ta) - 3.095 < Dc/Da < 11.652 \times (Tc/Ta)^2 - 18.420 \times (Tc/Ta) + 8.585$$

In still another aspect of the invention, the packing density Dc of the manganese dioxide, the packing density Da of the zinc or zinc alloy, the thickness Tc of the positive electrode in the radial direction, and the thickness Ta of the negative electrode in the radial direction satisfy the relational formula (3):

$$-8.895 \times (Tc/Ta)^2 + 12.864 \times (Tc/Ta) - 3.258 < Dc/Da < 8.895 \times (Tc/Ta)^2 - 16.244 \times (Tc/Ta) + 8.726$$

Advantageous Effects of Invention

The invention can heighten the packing densities of the positive electrode and the negative electrode and control the ratio of the packing densities of the positive and negative electrodes and the ratio of the thicknesses thereof in the radial direction in a good balance, compared with conventional art. It is therefore possible to provide a cylindrical alkaline battery with good discharge performance.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF EMBODIMENTS

The inventors have paid attention to the following points when attempting to heighten the density of the electrodes of cylindrical alkaline batteries.

The production of alkaline batteries is under two major constraints. One is a physical constraint on electrode production. The other is a constraint on the change made to electrode shape.

The physical constraint on electrode production refers to the limit of mechanical process. The production of a positive electrode includes the step of compression molding a positive electrode mixture to obtain a positive electrode pellet. However, the mold used for compression molding breaks when subjected to a stress larger than that it can withstand, and there is thus an upper limit to the force applied for compression molding. As such, the packing density of manganese dioxide in the positive electrode is limited to up to approximately 3 $g/cm^3$.

The production of a negative electrode includes the step of packing a gelled negative electrode into a predetermined part of a battery case. Increasing the packing density of zinc results in decreased flowability of the negative electrode, thereby making it difficult to pack the negative electrode tightly into the battery case. Thus, the packing density of zinc in the negative electrode is limited to up to approximately 2.3 $g/cm^3$.

The constraint on the change made to electrode shape means that the dimensions of the mold and tools used to compression mold or pack the electrode need to be determined precisely and that changing the dimensions is difficult. Changing the dimensions requires large costs. That is, there is low flexibility in replacing the mold and tools frequently in production activities.

For example, it is difficult to change the dimensions of the mold used to compression mold the positive electrode (the inner and outer diameters of the positive electrode) and the dimensions of the injection nozzle aperture for packing the negative electrode. It is important, in terms of battery productivity and production reliability, to determine the dimensions of the mold and nozzle with high reliability so that they can be used for an extended period of time.

Therefore, the electrode density needs to be heightened in conditions which satisfy the physical constraint on production and enable efficient and reliable production.

Also, alkaline batteries are under a structural constraint.

Alkaline batteries employ an inside-out structure. Specifically, an alkaline battery includes: a cylindrical battery case with a bottom; a cylindrical positive electrode contained in the battery case, the positive electrode having a hollow and including manganese dioxide and graphite; a negative electrode packed in the hollow of the positive electrode, the negative electrode including zinc or a zinc alloy; a separator interposed between the positive electrode and the negative electrode; a negative electrode current collector rod inserted into the negative electrode; and an alkaline electrolyte. More specifically, the positive electrode is in contact with the inner face of the battery case, and the battery case serves as a positive electrode current collector. The negative electrode current collector is inserted into a substantial center of the negative electrode along the axial direction of the alkaline battery.

The inside-out structure has smaller electrode areas and greater electrode thicknesses than the spiral structure employed in nickel-metal hydride storage batteries and lithium primary batteries, thus exhibiting large polarization. Large polarization lowers the speed of the electrode reactions. As a result, an electrical capacity cannot be efficiently obtained from the active materials. That is, the utilization rates of the active materials lower. When the density of an active material in an electrode is heightened, this tendency becomes more evident. It is therefore necessary to pay utmost attention when heightening the density of an electrode.

Also, the inventors have noted the following points when attempting to heighten the electrode density.

When an alkaline battery is discharged, the following reactions occur in the positive electrode and the negative electrode, respectively.

(Positive electrode)$MnO_2 + H^+ + e^- \rightarrow MnOOH$ (Negative electrode)$Zn + 4OH^- \rightarrow Zn(OH)_4^{2-} + 2e^-$ During discharge, $H^+$ diffuses in the positive electrode, while $OH^-$ diffuses in the negative electrode. The diffusion speed of $H^+$ is affected by the density of the positive electrode. The diffusion speed of $OH^-$ is affected by the density of the negative electrode. To optimize the balance of ion (electrolyte) diffusion between the positive electrode and the negative electrode, the ratio of the densities of the positive and negative electrodes is an important factor.

In alkaline batteries, the theoretical electrical capacity of the negative electrode is usually set to 1.0 to 1.25 times that of the positive electrode. Therefore, the electrical capacity of an alkaline battery is substantially determined by the theoretical electrical capacity of the positive electrode.

A method for increasing the electrical capacity of an alkaline battery is to increase the weight of the positive electrode active material to increase the theoretical electrical capacity of the positive electrode. However, since increasing the positive electrode weight while keeping the positive electrode density constant results in an increase in the positive electrode volume, the diameter and total height of the alkaline battery need to be enlarged. This requires major changes to specifications such as the dimensions of the respective components. In some cases, the size of the alkaline battery may become out of spec. Therefore, such a method is not practical.

To optimize the balance between the theoretical electrical capacity of the positive electrode and the theoretical electrical capacity of the negative electrode, the ratio of the thicknesses of the positive and negative electrodes in the radial direction is an important factor. In terms of the above point, it is desirable to examine the ratio of the thicknesses of the positive and negative electrodes in the radial direction while keeping constant the sum of the thickness of the positive electrode in the radial direction and the thickness of the negative electrode in the radial direction without changing the battery size.

Based on the points the inventors have paid attention to and noted, the inventors have diligently examined the relation between the discharge performance and the ratio of the packing densities of the positive and negative electrodes and the ratio of the thicknesses thereof in the radial direction. As a result, they have obtained the following findings (i) to (iii) in alkaline batteries including a high density positive electrode with a manganese dioxide packing density Dc of 2.8 to 3.0 g/cm³ and a high density negative electrode with a zinc or zinc alloy packing density Da of 2.0 to 2.3 g/cm³.

(i) When the packing density Dc of the manganese dioxide, the packing density Da of the zinc or zinc alloy, the thickness Tc of the positive electrode in the radial direction, and the thickness Ta of the negative electrode in the radial direction satisfy the following formula (1), good discharge performance can be obtained in both low-load discharge and high-load discharge. The closer to $\{-1.975 \times (Tc/Ta)+2.745\}$ Dc/Da is, the better the high-load discharge performance is. The closer to $\{-1.690 \times (Tc/Ta)+2.734\}$ Dc/Da is, the better the low-load discharge performance is.

$$-1.975 \times (Tc/Ta)+2.745 < Dc/Da < -1.690 \times (Tc/Ta)+2.734 \quad (1)$$

(ii) When the packing density Dc of the manganese dioxide, the packing density Da of the zinc or zinc alloy, the thickness Tc of the positive electrode in the radial direction, and the thickness Ta of the negative electrode in the radial direction satisfy the following formula (2), good high-load discharge performance can be obtained.

$$-11.652 \times (Tc/Ta)^2+14.470 \times (Tc/Ta)-3.095 < Dc/Da < 11.652 \times (Tc/Ta)^2-18.420 \times (Tc/Ta)+8.585 \quad (2)$$

(iii) When the packing density Dc of the manganese dioxide, the packing density Da of the zinc or zinc alloy, the thickness Tc of the positive electrode in the radial direction, and the thickness Ta of the negative electrode in the radial direction satisfy the following formula (3), good low-load discharge performance can be obtained.

$$-8.895 \times (Tc/Ta)^2+12.864 \times (Tc/Ta)-3.258 < Dc/Da < 8.895 \times (Tc/Ta)^2-16.244 \times (Tc/Ta)+8.726 \quad (3)$$

The above relations (i) to (iii) between the ratio of the packing densities of the positive and negative electrodes and the ratio of the thicknesses thereof in the radial direction have been found in combinations of high density positive and negative electrodes. In either of (i) to (iii), it is possible to satisfy the physical constraint on production and realize efficient and reliable production.

In terms of the positive electrode capacity and the positive electrode productivity, the packing density Dc of the manganese dioxide is 2.8 to 3 g/cm³, and preferably 2.85 to 2.95 g/cm³.

In the production of the positive electrode, it is necessary to limit the force applied to compression mold the positive electrode mixture into a pellet to prevent breakage of the mold used to compression mold the positive electrode mixture. Thus, the upper limit of the packing density Dc of the manganese dioxide is 3 g/cm³, and preferably 2.95 g/cm³. To increase the positive electrode capacity to obtain good low-load discharge performance and high-load discharge performance, the lower limit of the packing density Dc of the manganese dioxide is 2.8 g/cm³, and preferably 2.85 g/cm³. The range of the packing density Dc of the manganese dioxide may be any combination of the above-mentioned upper and lower limits.

The packing density Dc of the manganese dioxide can be determined from the following formula.

Packing density $Dc$ of manganese dioxide=Weight of manganese dioxide in positive electrode/Volume of positive electrode The positive electrode volume can be determined by, for example, taking an X-ray radiograph of the battery and measuring the outer diameter, inner diameter, and height of the positive electrode in the X-ray radiograph.

The weight of the manganese dioxide in the positive electrode can be determined by, for example, the following method.

The battery is disassembled, and all the positive electrode is taken out from the battery and sufficiently dissolved in an acid. The undissolved matter is filtrated out to obtain a sample solution. The content of manganese (Mn) in the sample solution is determined by ICP emission spectrometry (high frequency inductively coupled plasma emission spectroscopy). The content is converted to the amount of manganese dioxide ($MnO_2$), and the converted value is used as the weight of manganese dioxide in the positive electrode.

In terms of the negative electrode capacity and the negative electrode productivity, the packing density Da of the zinc or zinc alloy is 2 to 2.3 g/cm³, preferably 2.05 to 2.25 g/cm³, and more preferably 2.1 to 2.2 g/cm³.

In terms of maintaining the good flowability of the gelled negative electrode and allowing the negative electrode to be tightly packed in the battery case, the upper limit of the packing density Da of the zinc or zinc alloy is 2.3 g/cm³, preferably 2.25 g/cm³, and more preferably 2.2 g/cm³. To increase the negative electrode capacity to obtain good low-load discharge performance and high-load discharge performance, the lower limit of the packing density Da of the zinc or zinc alloy is 2 g/cm³, preferably 2.05 g/cm³, and more preferably 2.1 g/cm³. The range of the packing density Da of the zinc or zinc alloy may be any combination of the above-mentioned upper and lower limits.

The packing density Da of the zinc or zinc alloy can be determined from the following formula.

Packing density $Da$ of zinc or zinc alloy=Weight of zinc or zinc alloy in negative electrode/Volume of negative electrode The negative electrode volume can be determined by, for example, taking an X-ray radiograph of the battery and measuring the outer diameter, inner diameter, and height of the negative electrode in the X-ray radiograph.

The weight of the zinc or zinc alloy in the negative electrode can be determined by, for example, the following method.

The battery is disassembled, and all the negative electrode in the battery is taken out. The water-soluble substances and gelling agent are removed by decantation using water as a solvent. The resulting material is sufficiently dried so that it has, for example, a water content of 0.1% by weight or less to collect the zinc or zinc alloy, and the weight thereof is used as the weight of the zinc or zinc alloy in the negative electrode.

The thickness Tc of the positive electrode in the radial direction can be determined from the following formula.

Thickness $Tc$ of positive electrode in radial direction= (Outer diameter of positive electrode−Inner diameter of positive electrode)/2

The thickness Ta of the negative electrode in the radial direction can be determined from the following formula.

Thickness $Ta$ of negative electrode in radial direction= (Outer diameter of negative electrode−Inner diameter of negative electrode)/2

The inner diameter of the battery case can be used as the outer diameter of the positive electrode. The diameter of the body of the negative electrode current collector can be used as the inner diameter of the negative electrode.

Figure 1:
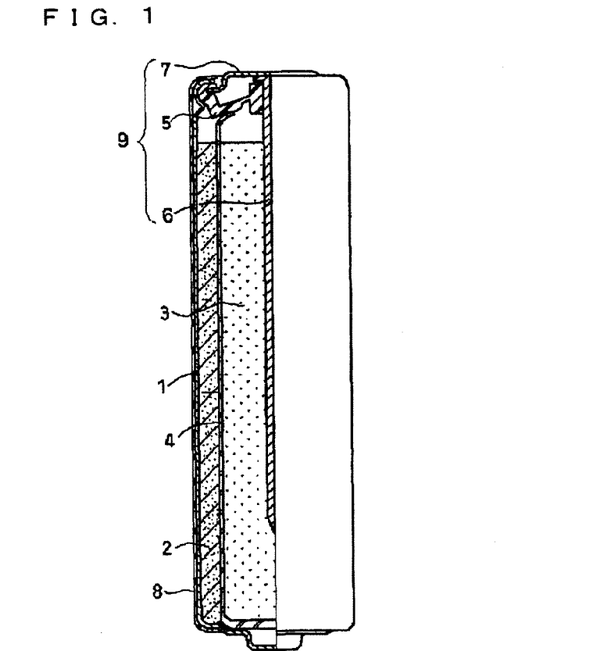
FIG. 1 is a partially sectional front view of a cylindrical alkaline battery in an Example of the invention.
Figure 2:
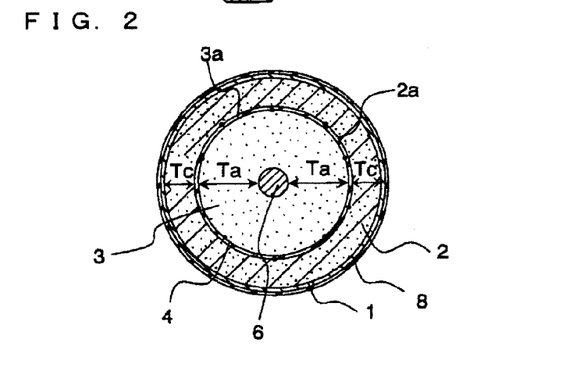
FIG. 2 is a cross-sectional view of the cylindrical alkaline battery of FIG. 1.

FIG. 1 is a partially longitudinal sectional view of a cylindrical alkaline battery. The inner diameter of the positive electrode and the outer diameter of the negative electrode can be determined by, for example, subjecting the body of the battery of FIG. 1 to a CT scan. Specifically, an image of a section of the battery of FIG. 1 perpendicular to the axial direction thereof, i.e., an image of a cross-section of the battery illustrated in FIG. 2, is taken by a CT scan. This battery includes: a cylindrical battery case 1 with a bottom; a hollow cylindrical positive electrode 2 contained in the battery case 1; a negative electrode 3 packed in the hollow of the positive electrode 2 with a separator 4 interposed therebetween; and a negative electrode current collector rod 6 inserted into a substantial center of the negative electrode 3.

Using the image of the section, almost equally distant five points on each of the inner circumference of the positive electrode and the outer circumference of the negative electrode (e.g., five points on an inner circumference 2a of the positive electrode 2 and five points on an outer circumference 3a of the negative electrode 3 in FIG. 2) are selected randomly. From the coordinates of these five points, the inner diameter of the positive electrode and the outer diameter of the negative electrode are calculated by the method of least squares. The CT scanner used is, for example, SMX-225 CTSV of SHIMAZU Corporation. The thickness of the positive electrode 2 corresponds to the dimension Tc in FIG. 2. The thickness of the negative electrode 3 corresponds to the dimension Ta in FIG. 2.

Also, the outer and inner diameters of the positive and negative electrodes can also be determined by taking an X-ray radiograph of the battery.

When the formula (1) is satisfied, the ratio Tc/Ta of the thickness Tc of the positive electrode in the radial direction to the thickness Ta of the negative electrode in the radial direction is preferably from 0.64 to 0.89.

When the formula (2) is satisfied, Tc/Ta is preferably from 0.64 to 0.78.

When the formula (3) is satisfied, Tc/Ta is preferably from 0.74 to 0.89.

In terms of the diffusion of the electrolyte in the thickness direction of the positive electrode and the utilization rate of the positive electrode, when the battery is of AA size, the thickness Tc of the positive electrode in the radial direction is preferably 2.23 to 2.73 mm.

In terms of the diffusion of the electrolyte in the thickness direction of the negative electrode and the utilization rate of the negative electrode, when the battery is of AA size, the thickness Ta of the negative electrode in the radial direction is preferably 2.90 to 3.56 mm.

To evaluate high-load discharge performance, for example, the following high-load discharge test is performed.

In an environment of 20±2° C., a 2-second discharge at 1.5 W and a 28-second discharge at 0.65 W are alternately repeated 10 times to perform a pulse discharge, which is followed by a 55-minute interval. This cycle is repeated until the closed circuit voltage of the battery reaches 1.05 V. This is a test simulating the use of a battery in a digital camera.

To evaluate low-load discharge performance, for example, the following low-load discharge test is performed.

In an environment of 20° C.±2° C., a 4-hour discharge at 43Ω and a subsequent 4-hour interval are repeated to perform an intermittent discharge until the closed circuit voltage reaches 0.9 V. This is a test simulating the use of a battery in a remote control unit.

When an AA size battery satisfies the formula (1), it exhibits good high-load discharge performance and low-load discharge performance, with the number of pulses in the high-load discharge test being 120 or more and the discharge time in the low-load discharge test being 95 hours or more. When the formula (1) is satisfied, the closer to $\{-1.975 \times (Tc/Ta) + 2.745\}$ Dc/Da is, the higher the high-load discharge performance is, and the number of pulses in the high-load discharge test becomes 130 or more. When the formula (1) is satisfied, the closer to $\{-1.690 \times (Tc/Ta) + 2.734\}$, the higher the low-load discharge performance is, and the discharge time in the low-load discharge test becomes 100 hours or more.

When an AA size battery satisfies the formula (2), it exhibits good high-load discharge performance, with the number of pulses being 130 or more.

When an AA size battery satisfies the formula (3), it exhibits good low-load discharge performance, with the discharge time in the low-load discharge test being 100 hours or more.

The number of pulses in the high-load discharge test refers to the total number of times the 1.5 W discharge and the 0.65 W discharge are alternately repeated until the closed circuit voltage of the battery reaches 1.05 V. The discharge time in the low-load discharge test refers to the total time of discharge at 43Ω until the closed circuit voltage reaches 0.9 V. In the above description, the discharge performance of AA size batteries is indicated, but other sizes than the AA size also have the same tendency.

The positive electrode includes a manganese dioxide powder as a positive electrode active material and a graphite powder as a conductive agent. If necessary, the positive electrode may further contain a binder. The positive electrode can be produced by, for example, compression molding a positive electrode mixture containing manganese dioxide, graphite, and an electrolyte into a pellet.

In terms of the packing properties of the positive electrode and the diffusion of the electrolyte in the positive electrode, the mean particle size of manganese dioxide is preferably 25 to 60 μm, and more preferably 30 to 45 μm. As used herein, the mean particle size refers to the median diameter (D50) in volume basis particle size distribution. The mean particle size can be determined by using, for example, a laser diffraction/scattering particle size distribution analyzer (LA-920) available from Horiba, Ltd.

In terms of the packing properties of the positive electrode, the upper limit of the mean particle size of manganese dioxide is preferably 60 μm, more preferably 45 μm, and even more preferably 40 μm. In terms of the diffusion of the electrolyte in the positive electrode, the lower limit of the mean particle size of manganese dioxide is preferably 25 μm, and more preferably 30 μm. The range of the mean particle size of manganese dioxide can be any combination of the above-mentioned upper and lower limits.

In terms of the packing properties and conductivity of the positive electrode and the diffusion of the electrolyte in the positive electrode, the mean particle size of graphite is preferably 3 to 20 μm, and more preferably 5 to 15 μm.

In terms of the packing properties and conductivity of the positive electrode, the upper limit of the mean particle size of graphite is preferably 20 μm, more preferably 15 μm, and even more preferably 12 μm. In terms of the conductivity of the positive electrode and the diffusion of the electrolyte in the positive electrode, the lower limit of the mean particle size of graphite is preferably 3 μm, and more preferably 5 μm. The range of the mean particle size of graphite can be any combination of the above-mentioned upper and lower limits.

To obtain a good balance between the packing properties and the conductivity of the positive electrode, the ratio P1/P2 of the mean particle size P1 of manganese dioxide to the mean article size P2 of graphite is preferably from 3.5 to 5.5, and more preferably from 4 to 5, and even more preferably from 4.25 to 4.75.

In terms of the packing properties of the positive electrode, the upper limit of P1/P2 is preferably 5.5, more preferably 5, and even more preferably 4.75. In terms of the conductivity of the positive electrode, the lower limit of P1/P2 is preferably 3.5, more preferably 4, and even more preferably 4.25. Any combination of the upper and lower limits of P1/P2 may be used.

To obtain a good balance between good high-load discharge performance and good low-load discharge performance, the graphite content in the positive electrode is preferably 3 to 10 parts by weight per 100 parts by weight of manganese dioxide, more preferably 3 to 8.5 parts by weight per 100 parts by weight of manganese dioxide, and even more preferably 3 to 6 parts by weight per 100 parts by weight of manganese dioxide.

To pack a sufficient amount of manganese dioxide in the positive electrode to enhance low-load discharge performance, the upper limit of the graphite content in the positive electrode is preferably 10 parts by weight per 100 parts by weight of manganese dioxide, more preferably 8.5 parts by weight per 100 parts by weight of manganese dioxide, and even more preferably 7.5 parts by weight per 100 parts by weight of manganese dioxide. To increase the conductivity of the positive electrode to enhance high-load discharge performance, the lower limit of the graphite content in the positive electrode is preferably 3 parts by weight per 100 parts by weight of manganese dioxide, more preferably 4.5 parts by weight per 100 parts by weight of manganese dioxide, and even more preferably 5.5 parts by weight per 100 parts by weight of manganese dioxide. The range of the graphite content in the positive electrode can be any combination of the above-mentioned upper and lower limits.

Manganese dioxide is preferably electrolytic manganese dioxide which is prepared by electrolyzing a manganese sulfate aqueous solution. Examples of the crystal structure of manganese dioxide include $\alpha$ type, $\beta$ type, $\gamma$ type, $\delta$ type, $\epsilon$ type, $\eta$ type, $\lambda$ type, and ramsdellite type. Among them, $\gamma$ type is preferable since it is widely commercially available, easily available, and inexpensive.

The potential of manganese dioxide is preferably relatively high, more preferably 290 to 350 mV, and even more preferably 300 to 325 mV. The potential of manganese dioxide as used herein refers to the potential in a potassium hydroxide aqueous solution (20° C.) having a concentration of 40% by weight relative to a mercury oxide (Hg/HgO) reference electrode.

Generally, high potential manganese dioxide is easily reduced by hydrogen gas produced from the zinc in the negative electrode inside the battery. However, in the invention, since the packing density of manganese dioxide in the positive electrode is high, diffusion of hydrogen gas into the positive electrode is suppressed. Therefore, the potential of manganese dioxide can be kept high, and a high output can be easily maintained over a long period of time.

Electrolytic manganese dioxide can be produced by, for example, the following method.

Natural manganese dioxide (NMD) is burned for reduction in a carbon monoxide atmosphere to obtain manganese oxide. The manganese oxide is dissolved in sulfuric acid with a predetermined concentration to form a manganese sulfate solution. Using the manganese sulfate solution as the electrolyte, electrolysis is performed to precipitate manganese dioxide on the anode. The anode used for electrolysis is, for example, a titanium electrode. Also, the cathode used is, for example, a carbon electrode.

The potential of manganese dioxide can be adjusted by, for example, changing the current density in the electrolysis for producing manganese dioxide and the electrolysis time, or changing the molar ratio of manganese to sulfuric acid in the manganese sulfate solution.

The potential of manganese dioxide can be measured by, for example, as follows.

20.0 g of a manganese dioxide sample, 0.15 g of a graphite powder (mean particle size 5 to 20 µm, for example, SP-20M available from Nippon Graphite Industries, Ltd.), and 20 ml of a potassium hydroxide aqueous solution (KOH concentration 40% by weight) are introduced into a 50-ml centrifuge tube. They are mixed and left at 20° C. for 24 hours. Thereafter, the centrifuge tube is placed in a centrifuge, which is then operated to precipitate the manganese dioxide sample on the bottom of the centrifuge tube. For example, the time of centrifugal separation is 3 minutes, and the number of revolutions per minute is 3000. With the potassium hydroxide aqueous solution (KOH concentration 40% by weight) contained in the centrifuge tube, a platinum electrode connected to the positive terminal of a digital voltmeter is brought into contact with the precipitate of the manganese dioxide sample. Further, a mercury oxide (Hg/HgO) reference electrode connected to the negative terminal of the digital voltmeter is brought into contact with the potassium hydroxide aqueous solution (supernatant). The difference between the potentials of the two electrodes is found.

Spinel-type electrolytic manganese dioxide may be used. Spinel-type electrolytic manganese dioxide can be produced by the following method. A lithium compound is added to electrolytic manganese dioxide, which is then baked to synthesize lithium manganese spinel. The lithium manganese spinel is treated with an acid to remove lithium.

The manganese atoms in the electrolytic manganese dioxide may be partially replaced with the atoms of at least one selected from the group consisting of nickel, cobalt, copper, tin, and titanium.

The negative electrode can be produced by, for example, adding a gelling agent and an electrolyte to a zinc or zinc alloy powder serving as a negative electrode active material in a predetermined ratio. In terms of the packing properties of the negative electrode, the amount of the gelling agent added is preferably 0.5 to 2 parts by weight per 100 parts by weight of the negative electrode active material. The gelling agent used is, for example, sodium polyacrylate. In terms of the packing properties of the negative electrode, the amount of the electrolyte added is preferably 40 to 60 parts by weight per 100 parts by weight of the negative electrode active material.

In terms of the packing properties of the negative electrode and the diffusion of the electrolyte in the negative electrode, the mean particle size of the zinc or zinc alloy is preferably 100 to 200 µm, and more preferably 110 to 160 µm.

In terms of the packing properties of the negative electrode, the upper limit of the mean particle size of the zinc or zinc alloy is preferably 200 µm, more preferably 160 µm, and even more preferably 150 µm. In terms of the diffusion of the electrolyte in the negative electrode, the lower limit of the mean particle size of the zinc or zinc alloy is preferably 100 µm, more preferably 110 µm, and even more preferably 120 µm. Any combination of the upper and lower limits of the mean particle size of the zinc or zinc alloy may be used.

To obtain good high-load discharge performance and good low-load discharge performance in a good balance, the zinc alloy or zinc preferably contains 25 to 38% by weight of particles with a particle size of 75 µm or less, more preferably contains 28 to 35% by weight of particles with a particle size of 75 µm or less, and even more preferably contains 30 to 35% by weight of particles with a particle size of 75 µm or less.

To form a sufficient conductive network of the zinc particles to obtain good high-load discharge performance, the lower limit of the content of the particles with a particle size of 75 µm or less is preferably 25% by weight, more preferably 28% by weight, and even more preferably 30% by weight. To maintain the good flowability of the gelled negative electrode and allow the negative electrode to be tightly packed in the battery case, the upper limit of the content of the particles with a particle size of 75 μm or less is preferably 38% by weight, and more preferably 35% by weight. Any combination of the upper and lower limits of the content of the particles with a particle size of 75 μm or less may be used. The content of the particles with a particle size of 75 μm or less can be determined by using, for example, a laser diffraction/scattering particle size distribution analyzer (LA-920) available from Horiba, Ltd.

In terms of the corrosion resistance of the zinc alloy, the zinc alloy preferably includes indium, bismuth, or aluminum. These elements can be used singly or in combination. The indium content in the zinc alloy is preferably 0.01 to 0.1% by weight. The bismuth content in the zinc alloy is preferably 0.003 to 0.02% by weight. The aluminum content in the zinc alloy is preferably 0.001 to 0.03% by weight. In terms of the corrosion resistance of the zinc alloy, the ratio of the other element(s) than zinc in the zinc alloy is preferably 0.025 to 0.08% by weight.

To heighten the density of the negative electrode of the invention and securing both a good conductive network between the zinc or zinc alloy particles and the packing properties of the negative electrode, the zinc or zinc alloy preferably contains 50% by weight or more of particles with an aspect ratio of from 2 to 5, and more preferably contains 70% by weight or more of particles with an aspect ratio of from 2 to 5.

The content of the particles with an aspect ratio of from 2 to 5 can be determined by, for example, the following method. To determine aspect ratio, for example, using a sieve, the zinc or zinc alloy powder is classified into three kinds of: a powder of more than 200 mesh (less than a particle size of 75 μm); a powder of 200 mesh or less and 100 mesh or more (a particle size of 75 μm or more and 150 μm or less); and a powder of less than 100 mesh (more than a particle size of 150 μm). From each of these powders, 10 particles are selected randomly, and the shorter and longer dimensions of each particle are measured with an optical microscope to determine the aspect ratio. When the 3×10 particles contain N particles with an aspect ratio of from 2 to 5, they contain (N/30)×100% by weight of particles with an aspect ratio of from 2 to 5. For example, when N is 15 or more, they contain 50% by weight or more of particles with an aspect ratio of from 2 to 5.

The separator can be, for example, a non-woven fabric sheet composed mainly of cellulose fibers and polyvinyl alcohol fibers. Also, the separator can be, for example, a non-woven fabric sheet composed mainly of polyvinyl alcohol fibers and rayon fibers. The separator can be a micro-porous film sheet such as cellophane, if necessary.

When the battery is of AA size, the thickness of the separator is preferably 0.2 to 0.5 mm, and more preferably 0.2 to 0.3 mm. When the thickness of the separator is 0.5 mm or less, the internal resistance of the battery can be sufficiently reduced. When the density of the negative electrode is heightened, the expansion of the negative electrode during discharge becomes so large that it cannot be ignored. When the thickness of the separator is 0.2 mm or more, the flexible separator can sufficiently absorb the expansion of the high density negative electrode during discharge.

The electrolyte is contained in the positive electrode, the negative electrode, and the separator. The electrolyte can be an alkaline aqueous solution containing potassium hydroxide. The alkaline aqueous solution can further contain zinc oxide. The potassium hydroxide concentration in the electrolyte is preferably 30 to 38% by weight.

To obtain good high-load discharge performance, the potassium hydroxide concentration in the electrolyte is more preferably 30 to 35% by weight. Also, to obtain good low-load discharge performance, the potassium hydroxide concentration in the electrolyte is more preferably 33 to 38% by weight. To obtain both good low-load discharge performance and good high-load discharge performance, the potassium hydroxide concentration in the electrolyte is even more preferably 33 to 35% by weight.

The zinc oxide concentration in the electrolyte is preferably 1 to 3% by weight, and more preferably 1.5 to 2.5% by weight.

The negative electrode current collector is, for example, a molded nail made of brass. When the battery is of AA size, the diameter of the body of the negative electrode current collector is preferably 1.1 to 1.5 mm.

In terms of corrosion resistance, it is preferable to coat the brass surface with a tin plating layer. In terms of the current collection ability and protection of brass, the thickness of the tin plating layer is preferably 0.3 to 3.0 μm.

The battery case can be, for example, a cylindrical metal case with a bottom. The metal case can be made of, for example, a nickel plated steel plate. To provide good adhesion between the positive electrode and the battery case, it is preferable to use a battery case comprising a metal case whose inner face is coated with a carbon film.

To withstand the pressure applied to fit the positive electrode closely to the inner face of the battery case and the expansion of the positive electrode during discharge, the thickness of the cylindrical portion of the battery case is preferably 0.15 mm or more. To increase the internal volume of the battery case, the thickness of the cylindrical portion of the battery case is preferably 0.20 mm or less, and more preferably 0.18 mm or less.

To withstand the pressure applied to fit the positive electrode closely to the inner face of the battery case and the expansion of the positive electrode during discharge, the thickness of the bottom of the battery case is preferably 0.25 mm or more. To increase the internal volume of the battery case, the thickness of the bottom of the battery case is preferably 0.40 mm or less.

EXAMPLES

Examples of the invention are hereinafter described in details, but the invention is not to be construed as being limited to the following Examples.

Cylindrical alkaline batteries illustrated in FIG. 1 were produced in the following manner.

(1) Preparation of Positive Electrode

An electrolytic manganese dioxide powder (mean particle size 35 μm) serving as a positive electrode active material was mixed with a graphite powder (mean particle size 8 μm) serving as a conductive agent to obtain a mixture. The weight ratio of electrolytic manganese dioxide to graphite was set to 96.7:3.3. The ratio P1/P2 of the mean particle size P1 of electrolytic manganese dioxide to the mean particle size P2 of graphite was 4.375. The electrolytic manganese dioxide used had a potential of 304 mV relative to a mercury oxide (Hg/HgO) reference electrode at 20° C. The mixture was mixed with an electrolyte, stirred sufficiently, and pressed into flakes. The weight ratio of the mixture to the electrolyte was set to 100:1.2. The electrolyte used was an alkaline aqueous solution containing potassium hydroxide (KOH concentration 33% by weight) and zinc oxide (ZnO concentration 2% by weight).

The flakes of the positive electrode mixture were crushed into granules, which were then classified with a sieve. The granules of 10 to 100 mesh were compression molded into the shape of a hollow cylinder to obtain a positive electrode pellet 2.

(2) Preparation of Negative Electrode

A zinc alloy powder (having a mean particle size of 130 μm, containing 30% by weight of particles with a particle size of 75 μm or less, and containing 80% by weight of particles with an aspect ratio of from 2 to 5) serving as a negative electrode active material, the above-mentioned electrolyte, and a gelling agent were mixed in a weight ratio of 66.2:33.0:0.8 to obtain a gelled negative electrode 3. The zinc alloy used was a zinc alloy containing 0.02% by weight of indium, 0.01% by weight of bismuth, and 0.005% by weight of aluminum. The gelling agent used was a mixture of: a thickener comprising crosslinked, branched polyacrylic acid; and a water absorbing polymer comprising highly crosslinked chain sodium polyacrylate. The weight ratio of the thickener to the water absorbing polymer was set to 0.26:0.54.

(3) Assembly of Alkaline Battery

Varniphite of Nippon Graphite Industries, Ltd. was applied onto the inner face of a cylindrical case with a bottom made of a nickel plated steel plate (outer diameter 13.80 mm, cylindrical portion thickness 0.15 mm, bottom thickness 0.35 mm, and height 50.3 mm) to form a carbon film with a thickness of approximately 10 μm to obtain a battery case 1. The positive electrode 2 was inserted into the battery case 1, and pressure was applied to fit the positive electrode 2 closely to the inner wall of the battery case 1. A cylindrical separator 4 (thickness 0.24 mm) with a bottom was disposed inside the positive electrode 2, and the above-mentioned electrolyte was injected into the separator 4. The separator used was a non-woven fabric sheet (basis weight 28 g/m$^2$, thickness 0.08 mm) composed mainly of cellulose fibers made by solution spinning and polyvinyl alcohol fibers in a weight ratio of 1:1 and rolled up three times. In this state, it was left for a predetermined time to disperse the electrolyte from the separator 4 into the positive electrode 2. Thereafter, the negative electrode 3 was packed into the separator 4.

Brass was pressed into the shape of a nail, and the surface was plated with tin to obtain a negative electrode current collector 6. The diameter of the body of the negative electrode current collector 6 was set to 1.15 mm. The head of the negative electrode current collector 6 was electrically welded to a negative electrode terminal plate 7 made of a nickel plated steel plate. Thereafter, the body of the negative electrode current collector 6 was forced into the through-hole at the center of a gasket 5 composed mainly of polyamide 6,12. In this manner, a seal unit 9 consisting of the gasket, the negative electrode terminal plate, and the negative electrode current collector was produced.

The seal unit 9 was fitted to the opening of the battery case 1. At this time, the body of the negative electrode current collector 6 was inserted into the negative electrode 3. The open edge of the battery case 1 was crimped onto the edge of the negative electrode terminal plate 7 with the gasket 5 interposed therebetween, to seal the opening of the battery case 1. The outer surface of the battery case 1 was coated with an outer label 8. In this manner, AA size alkaline dry batteries (LR6) were produced.

In the production of the batteries, the ratio Dc/Da of the packing densities of the positive and negative electrodes and the ratio Tc/Ta of the thicknesses thereof in the radial direction were varied under the conditions shown in Tables 1 to 9. As shown in Table 1, batteries A1 to A10 were produced by using the combination No. 1 of the packing densities of the positive and negative electrodes (Dc/Da=2.8/2) and varying Tc/Ta in the range of 0.525 to 1.006. As shown in Table 2, batteries B1 to B10 were produced by using the combination No. 2 of the packing densities of the positive and negative electrodes (Dc/Da=2.8/2.3) and varying Tc/Ta in the range of 0.525 to 1.006. As shown in Table 3, batteries C1 to C10 were produced by using the combination No. 3 of the packing densities of the positive and negative electrodes (Dc/Da=3/2.3) and varying Tc/Ta in the range of 0.525 to 1.006. As shown in Table 4, batteries D1 to D10 were produced by using the combination No. 4 of the packing densities of the positive and negative electrodes (Dc/Da=3/2) and varying Tc/Ta in the range of 0.525 to 1.006. As shown in Table 5, batteries E1 to E10 were produced by using the combination No. 5 of the packing densities of the positive and negative electrodes (Dc/Da=2.9/2.15) and varying Tc/Ta in the range of 0.525 to 1.006. As shown in Table 6, batteries F1 to F10 were produced by using the combination No. 6 of the packing densities of the positive and negative electrodes (Dc/Da=2.85/2.08) and varying Tc/Ta in the range of 0.562 to 1.136. As shown in Table 7, batteries G1 to G10 were produced by using the combination No. 7 of the packing densities of the positive and negative electrodes (Dc/Da=2.95/2.23) and varying Tc/Ta in the range of 0.546 to 1.061. As shown in Table 8, batteries H1 to H10 were produced by using the combination No. 8 of the packing densities of the positive and negative electrodes (Dc/Da=2.85/2.23) and varying Tc/Ta in the range of 0.586 to 1.206. As shown in Table 9, batteries I1 to I10 were produced by using the combination No. 9 of the packing densities of the positive and negative electrodes (Dc/Da=2.95/2.08) and varying Tc/Ta in the range of 0.586 to 1.206.

In the combinations Nos. 6, 8, and 9 of the packing densities of the positive and negative electrodes, the thickness of the non-woven fabric sheet used as the separator was changed to 0.16 mm. That is, the thickness of the separator was set to 0.48 mm. In the combinations Nos. 7 to 9 of the packing densities of the positive and negative electrodes, the diameter of the body of the negative electrode current collector was changed to 1.45 mm.

The thickness of the positive electrode was adjusted by changing the inner diameter of the positive electrode. The inner diameter of the positive electrode was adjusted by changing the dimensions of the mold used for compression molding. The thickness of the negative electrode was adjusted by changing the inner diameter of the positive electrode, the thickness of the separator, or the diameter of the body of the negative electrode current collector. The packing density of manganese dioxide in the positive electrode was adjusted by changing the weight of the positive electrode (manganese dioxide), the thickness of the positive electrode, or the force applied for compression molding. The packing density of the zinc alloy in the negative electrode was adjusted by changing the weight of the negative electrode (zinc or zinc alloy) or the thickness of the negative electrode. The height of the positive electrode and the height of the negative electrode in the battery case were set to approximately 42.9 mm.

In Tables 1 to 9, the inner diameters of the positive electrodes are those of the positive electrodes impregnated with the electrolyte which has been injected into the separator to permeate the positive electrodes.

TABLE 1

| Combination No. of packing densities of positive and negative electrodes | Battery No. | Packing density Dc of manganese dioxide (g/cm³) | Packing density Da of zinc alloy (g/cm³) | Weight of positive electrode (g) | Inner diameter of positive electrode (mm) | Amount of electrolyte injected into separator (g) | Weight of negative electrode (g) | Thickness Tc of positive electrode (mm) | Thickness Ta of negative electrode (mm) | Tc/Ta (Actually measured value) | Dc/Da (Actually measured value) |
|---|---|---|---|---|---|---|---|---|---|---|---|
| 1 | A1  | 2.80 | 2.00 | 12.19 | 7.59 | 2.00 | 5.01 | 2.93 | 2.92 | 1.006 | 1.398 |
|   | A2  |      |      | 11.89 | 7.79 | 1.97 | 5.30 | 2.83 | 3.02 | 0.937 | 1.401 |
|   | A3  |      |      | 11.57 | 7.99 | 1.92 | 5.62 | 2.73 | 3.13 | 0.873 | 1.398 |
|   | A4  |      |      | 11.26 | 8.19 | 1.88 | 5.94 | 2.63 | 3.24 | 0.813 | 1.398 |
|   | A5  |      |      | 10.93 | 8.39 | 1.85 | 6.26 | 2.53 | 3.35 | 0.757 | 1.398 |
|   | A6  |      |      | 10.59 | 8.59 | 1.81 | 6.60 | 2.43 | 3.45 | 0.705 | 1.398 |
|   | A7  |      |      | 10.26 | 8.79 | 1.77 | 6.93 | 2.33 | 3.56 | 0.656 | 1.400 |
|   | A8  |      |      | 9.90  | 8.99 | 1.73 | 7.29 | 2.23 | 3.67 | 0.609 | 1.399 |
|   | A9  |      |      | 9.54  | 9.19 | 1.68 | 7.64 | 2.13 | 3.77 | 0.566 | 1.398 |
|   | A10 |      |      | 9.18  | 9.39 | 1.63 | 8.01 | 2.03 | 3.88 | 0.525 | 1.399 |

TABLE 2

| Combination No. of packing densities of positive and negative electrodes | Battery No. | Packing density Dc of manganese dioxide (g/cm³) | Packing density Da of zinc alloy (g/cm³) | Weight of positive electrode (g) | Inner diameter of positive electrode (mm) | Amount of electrolyte injected into separator (g) | Weight of negative electrode (g) | Thickness Tc of positive electrode (mm) | Thickness Ta of negative electrode (mm) | Tc/Ta (Actually measured value) | Dc/Da (Actually measured value) |
|---|---|---|---|---|---|---|---|---|---|---|---|
| 2 | B1  | 2.80 | 2.30 | 12.19 | 7.59 | 1.68 | 5.41 | 2.93 | 2.92 | 1.006 | 1.216 |
|   | B2  |      |      | 11.89 | 7.79 | 1.63 | 5.73 | 2.83 | 3.02 | 0.937 | 1.219 |
|   | B3  |      |      | 11.57 | 7.99 | 1.57 | 6.07 | 2.73 | 3.13 | 0.873 | 1.217 |
|   | B4  |      |      | 11.26 | 8.19 | 1.50 | 6.41 | 2.63 | 3.24 | 0.813 | 1.218 |
|   | B5  |      |      | 10.93 | 8.39 | 1.45 | 6.77 | 2.53 | 3.35 | 0.757 | 1.216 |
|   | B6  |      |      | 10.59 | 8.59 | 1.39 | 7.13 | 2.43 | 3.45 | 0.705 | 1.217 |
|   | B7  |      |      | 10.26 | 8.79 | 1.32 | 7.50 | 2.33 | 3.56 | 0.656 | 1.218 |
|   | B8  |      |      | 9.90  | 8.99 | 1.25 | 7.88 | 2.23 | 3.67 | 0.609 | 1.216 |
|   | B9  |      |      | 9.54  | 9.19 | 1.19 | 8.27 | 2.13 | 3.77 | 0.566 | 1.217 |
|   | B10 |      |      | 9.18  | 9.39 | 1.11 | 8.65 | 2.03 | 3.88 | 0.525 | 1.219 |

TABLE 3

| Combination No. of packing densities of positive and negative electrodes | Battery No. | Packing density Dc of manganese dioxide (g/cm³) | Packing density Da of zinc alloy (g/cm³) | Weight of positive electrode (g) | Inner diameter of positive electrode (mm) | Amount of electrolyte injected into separator (g) | Weight of negative electrode (g) | Thickness Tc of positive electrode (mm) | Thickness Ta of negative electrode (mm) | Tc/Ta (Actually measured value) | Dc/Da (Actually measured value) |
|---|---|---|---|---|---|---|---|---|---|---|---|
| 3 | C1  | 3.00 | 2.30 | 13.06 | 7.59 | 1.39 | 5.02 | 2.93 | 2.92 | 1.006 | 1.303 |
|   | C2  |      |      | 12.74 | 7.79 | 1.35 | 5.36 | 2.83 | 3.02 | 0.937 | 1.306 |
|   | C3  |      |      | 12.40 | 7.99 | 1.30 | 5.70 | 2.73 | 3.13 | 0.873 | 1.304 |
|   | C4  |      |      | 12.07 | 8.19 | 1.24 | 6.05 | 2.63 | 3.24 | 0.813 | 1.305 |
|   | C5  |      |      | 11.71 | 8.39 | 1.19 | 6.42 | 2.53 | 3.35 | 0.757 | 1.304 |
|   | C6  |      |      | 11.35 | 8.59 | 1.13 | 6.79 | 2.43 | 3.45 | 0.705 | 1.304 |
|   | C7  |      |      | 10.98 | 8.79 | 1.08 | 7.18 | 2.33 | 3.56 | 0.656 | 1.304 |
|   | C8  |      |      | 10.61 | 8.99 | 1.02 | 7.57 | 2.23 | 3.67 | 0.609 | 1.303 |
|   | C9  |      |      | 10.22 | 9.19 | 0.95 | 7.96 | 2.13 | 3.77 | 0.566 | 1.304 |
|   | C10 |      |      | 9.84  | 9.39 | 0.90 | 8.36 | 2.03 | 3.88 | 0.525 | 1.306 |

TABLE 4

| Combination No. of packing densities of positive and negative electrodes | Battery No. | Packing density Dc of manganese dioxide (g/cm³) | Packing density Da of zinc alloy (g/cm³) | Weight of positive electrode (g) | Inner diameter of positive electrode (mm) | Amount of electrolyte injected into separator (g) | Weight of negative electrode (g) | Thickness Tc of positive electrode (mm) | Thickness Ta of negative electrode (mm) | Tc/Ta (Actually measured value) | Dc/Da (Actually measured value) |
|---|---|---|---|---|---|---|---|---|---|---|---|
| 4 | D1 | 3.00 | 2.00 | 13.06 | 7.59 | 1.71 | 4.62 | 2.93 | 2.92 | 1.006 | 1.497 |
|   | D2 |      |      | 12.74 | 7.79 | 1.69 | 4.93 | 2.83 | 3.02 | 0.937 | 1.500 |
|   | D3 |      |      | 12.40 | 7.99 | 1.66 | 5.26 | 2.73 | 3.13 | 0.873 | 1.497 |
|   | D4 |      |      | 12.07 | 8.19 | 1.63 | 5.59 | 2.63 | 3.24 | 0.813 | 1.498 |
|   | D5 |      |      | 11.71 | 8.39 | 1.60 | 5.92 | 2.53 | 3.35 | 0.757 | 1.498 |
|   | D6 |      |      | 11.35 | 8.59 | 1.56 | 6.27 | 2.43 | 3.45 | 0.705 | 1.498 |

TABLE 4-continued

| Combination No. of packing densities of positive and negative electrodes | Battery No. | Packing density Dc of manganese dioxide (g/cm³) | Packing density Da of zinc alloy (g/cm³) | Weight of positive electrode (g) | Inner diameter of positive electrode (mm) | Amount of electrolyte injected into separator (g) | Weight of negative electrode (g) | Thickness Tc of positive electrode (mm) | Thickness Ta of negative electrode (mm) | Tc/Ta (Actually measured value) | Dc/Da (Actually measured value) |
|---|---|---|---|---|---|---|---|---|---|---|---|
| | D7 | | | 10.98 | 8.79 | 1.53 | 6.61 | 2.33 | 3.56 | 0.656 | 1.499 |
| | D8 | | | 10.61 | 8.99 | 1.50 | 6.98 | 2.23 | 3.67 | 0.609 | 1.499 |
| | D9 | | | 10.22 | 9.19 | 1.45 | 7.34 | 2.13 | 3.77 | 0.566 | 1.498 |
| | D10 | | | 9.84 | 9.39 | 1.42 | 7.72 | 2.03 | 3.88 | 0.525 | 1.499 |

TABLE 5

| Combination No. of packing densities of positive and negative electrodes | Battery No. | Packing density Dc of manganese dioxide (g/cm³) | Packing density Da of zinc alloy (g/cm³) | Weight of positive electrode (g) | Inner diameter of positive electrode (mm) | Amount of electrolyte injected into separator (g) | Weight of negative electrode (g) | Thickness Tc of positive electrode (mm) | Thickness Ta of negative electrode (mm) | Tc/Ta (Actually measured value) | Dc/Da (Actually measured value) |
|---|---|---|---|---|---|---|---|---|---|---|---|
| 5 | E1 | 2.90 | 2.15 | 12.63 | 7.59 | 1.70 | 5.01 | 2.93 | 2.92 | 1.006 | 1.350 |
| | E2 | | | 12.32 | 7.79 | 1.66 | 5.34 | 2.83 | 3.02 | 0.937 | 1.347 |
| | E3 | | | 12.00 | 7.99 | 1.61 | 5.65 | 2.73 | 3.13 | 0.873 | 1.351 |
| | E4 | | | 11.67 | 8.19 | 1.56 | 5.99 | 2.63 | 3.24 | 0.813 | 1.349 |
| | E5 | | | 11.32 | 8.39 | 1.52 | 6.35 | 2.53 | 3.35 | 0.757 | 1.348 |
| | E6 | | | 10.99 | 8.59 | 1.47 | 6.69 | 2.43 | 3.45 | 0.705 | 1.351 |
| | E7 | | | 10.62 | 8.79 | 1.42 | 7.06 | 2.33 | 3.56 | 0.656 | 1.348 |
| | E8 | | | 10.26 | 8.99 | 1.37 | 7.43 | 2.23 | 3.67 | 0.609 | 1.347 |
| | E9 | | | 9.89 | 9.19 | 1.32 | 7.80 | 2.13 | 3.77 | 0.566 | 1.349 |
| | E10 | | | 9.50 | 9.39 | 1.26 | 8.19 | 2.03 | 3.88 | 0.525 | 1.347 |

TABLE 6

| Combination No. of packing densities of positive and negative electrodes | Battery No. | Packing density Dc of manganese dioxide (g/cm³) | Packing density Da of zinc alloy (g/cm³) | Weight of positive electrode (g) | Inner diameter of positive electrode (mm) | Amount of electrolyte injected into separator (g) | Weight of negative electrode (g) | Thickness Tc of positive electrode (mm) | Thickness Ta of negative electrode (mm) | Tc/Ta (Actually measured value) | Dc/Da (Actually measured value) |
|---|---|---|---|---|---|---|---|---|---|---|---|
| 6 | F1 | 2.85 | 2.08 | 12.41 | 7.59 | 2.17 | 4.02 | 2.93 | 2.58 | 1.136 | 1.373 |
| | F2 | | | 12.11 | 7.79 | 2.12 | 4.33 | 2.83 | 2.70 | 1.049 | 1.371 |
| | F3 | | | 11.78 | 7.99 | 2.09 | 4.65 | 2.73 | 2.82 | 0.969 | 1.371 |
| | F4 | | | 11.46 | 8.19 | 2.05 | 4.99 | 2.63 | 2.94 | 0.897 | 1.370 |
| | F5 | | | 11.12 | 8.39 | 2.00 | 5.32 | 2.53 | 3.05 | 0.830 | 1.370 |
| | F6 | | | 10.79 | 8.59 | 1.95 | 5.66 | 2.43 | 3.17 | 0.768 | 1.370 |
| | F7 | | | 10.43 | 8.79 | 1.91 | 6.01 | 2.33 | 3.28 | 0.711 | 1.371 |
| | F8 | | | 10.09 | 8.99 | 1.86 | 6.37 | 2.23 | 3.40 | 0.658 | 1.372 |
| | F9 | | | 9.71 | 9.19 | 1.82 | 6.73 | 2.13 | 3.51 | 0.608 | 1.372 |
| | F10 | | | 9.35 | 9.39 | 1.78 | 7.11 | 2.03 | 3.62 | 0.562 | 1.373 |

TABLE 7

| Combination No. of packing densities of positive and negative electrodes | Battery No. | Packing density Dc of manganese dioxide (g/cm³) | Packing density Da of zinc alloy (g/cm³) | Weight of positive electrode (g) | Inner diameter of positive electrode (mm) | Amount of electrolyte injected into separator (g) | Weight of negative electrode (g) | Thickness Tc of positive electrode (mm) | Thickness Ta of negative electrode (mm) | Tc/Ta (Actually measured value) | Dc/Da (Actually measured value) |
|---|---|---|---|---|---|---|---|---|---|---|---|
| 7 | G1 | 2.95 | 2.23 | 12.85 | 7.59 | 1.57 | 4.98 | 2.93 | 2.77 | 1.061 | 1.323 |
| | G2 | | | 12.53 | 7.79 | 1.52 | 5.31 | 2.83 | 2.87 | 0.986 | 1.323 |
| | G3 | | | 12.20 | 7.99 | 1.47 | 5.65 | 2.73 | 2.98 | 0.917 | 1.322 |
| | G4 | | | 11.87 | 8.19 | 1.42 | 5.99 | 2.63 | 3.09 | 0.852 | 1.323 |
| | G5 | | | 11.52 | 8.39 | 1.37 | 6.35 | 2.53 | 3.20 | 0.793 | 1.323 |
| | G6 | | | 11.17 | 8.59 | 1.32 | 6.71 | 2.43 | 3.30 | 0.737 | 1.324 |
| | G7 | | | 10.80 | 8.79 | 1.27 | 7.09 | 2.33 | 3.41 | 0.684 | 1.321 |
| | G8 | | | 10.43 | 8.99 | 1.22 | 7.46 | 2.23 | 3.52 | 0.635 | 1.323 |
| | G9 | | | 10.06 | 9.19 | 1.16 | 7.85 | 2.13 | 3.62 | 0.589 | 1.322 |
| | G10 | | | 9.68 | 9.39 | 1.10 | 8.24 | 2.03 | 3.73 | 0.546 | 1.326 |

TABLE 8

| Combination No. of packing densities of positive and negative electrodes | Battery No. | Packing density Dc of manganese dioxide (g/cm³) | Packing density Da of zinc alloy (g/cm³) | Weight of positive electrode (g) | Inner diameter of positive electrode (mm) | Amount of electrolyte injected into separator (g) | Weight of negative electrode (g) | Thickness Tc of positive electrode (mm) | Thickness Ta of negative electrode (mm) | Tc/Ta (Actually measured value) | Dc/Da (Actually measured value) |
|---|---|---|---|---|---|---|---|---|---|---|---|
| 8 | H1 | 2.85 | 2.23 | 12.41 | 7.59 | 2.07 | 4.15 | 2.93 | 2.43 | 1.206 | 1.279 |
|   | H2 |      |      | 12.11 | 7.79 | 2.01 | 4.47 | 2.83 | 2.55 | 1.110 | 1.280 |
|   | H3 |      |      | 11.78 | 7.99 | 1.97 | 4.81 | 2.73 | 2.67 | 1.024 | 1.278 |
|   | H4 |      |      | 11.46 | 8.19 | 1.91 | 5.14 | 2.63 | 2.79 | 0.945 | 1.279 |
|   | H5 |      |      | 11.12 | 8.39 | 1.86 | 5.50 | 2.53 | 2.90 | 0.873 | 1.279 |
|   | H6 |      |      | 10.79 | 8.59 | 1.81 | 5.84 | 2.43 | 3.02 | 0.806 | 1.284 |
|   | H7 |      |      | 10.43 | 8.79 | 1.74 | 6.22 | 2.33 | 3.13 | 0.745 | 1.277 |
|   | H8 |      |      | 10.08 | 8.99 | 1.69 | 6.59 | 2.23 | 3.25 | 0.688 | 1.280 |
|   | H9 |      |      | 9.71  | 9.19 | 1.63 | 6.98 | 2.13 | 3.36 | 0.635 | 1.278 |
|   | H10|      |      | 9.35  | 9.39 | 1.57 | 7.37 | 2.03 | 3.47 | 0.586 | 1.278 |

TABLE 9

| Combination No. of packing densities of positive and negative electrodes | Battery No. | Packing density Dc of manganese dioxide (g/cm³) | Packing density Da of zinc alloy (g/cm³) | Weight of positive electrode (g) | Inner diameter of positive electrode (mm) | Amount of electrolyte injected into separator (g) | Weight of negative electrode (g) | Thickness Tc of positive electrode (mm) | Thickness Ta of negative electrode (mm) | Tc/Ta (Actually measured value) | Dc/Da (Actually measured value) |
|---|---|---|---|---|---|---|---|---|---|---|---|
| 9 | I1 | 2.95 | 2.08 | 12.85 | 7.59 | 2.05 | 3.79 | 2.93 | 2.43 | 1.206 | 1.421 |
|   | I2 |      |      | 12.53 | 7.79 | 2.01 | 4.11 | 2.83 | 2.55 | 1.110 | 1.418 |
|   | I3 |      |      | 12.20 | 7.99 | 1.98 | 4.43 | 2.73 | 2.67 | 1.024 | 1.419 |
|   | I4 |      |      | 11.87 | 8.19 | 1.94 | 4.77 | 2.63 | 2.79 | 0.945 | 1.418 |
|   | I5 |      |      | 11.52 | 8.39 | 1.90 | 5.11 | 2.53 | 2.90 | 0.873 | 1.419 |
|   | I6 |      |      | 11.17 | 8.59 | 1.86 | 5.46 | 2.43 | 3.02 | 0.806 | 1.418 |
|   | I7 |      |      | 10.80 | 8.79 | 1.82 | 5.82 | 2.33 | 3.13 | 0.745 | 1.418 |
|   | I8 |      |      | 10.43 | 8.99 | 1.77 | 6.18 | 2.23 | 3.25 | 0.688 | 1.419 |
|   | I9 |      |      | 10.06 | 9.19 | 1.74 | 6.55 | 2.13 | 3.36 | 0.635 | 1.420 |
|   | I10|      |      | 9.68  | 9.39 | 1.68 | 6.93 | 2.03 | 3.47 | 0.586 | 1.422 |

The thickness Tc of the positive electrode was determined from the following formula.

Positive electrode thickness $Tc$=(Outer diameter of positive electrode−Inner diameter of positive electrode)/2

The thickness of the negative electrode was determined from the following formula.

Negative electrode thickness $Ta$=(Outer diameter of negative electrode−Inner diameter of negative electrode)/2

The inner diameter of the battery case was used as the outer diameter of the positive electrode.

The diameter of the body of the negative electrode current collector was used as the inner diameter of the negative electrode.

The inner diameter of the positive electrode and the outer diameter of the negative electrode were determined by subjecting the body of the battery to a CT scan. An image of a cross-section of the battery shown in FIG. 2 was taken by a CT scan. Using the image of the section, almost equally distant five points on each of the inner circumference of the positive electrode and the outer circumference of the negative electrode (five points on the inner circumference 2a of the positive electrode 2 and five points on the outer circumference 3a of the negative electrode 3 in FIG. 2) were selected randomly. From the coordinates thereof, the inner and outer diameters of the positive and negative electrodes were calculated by the method of least squares. SMX-225 CTSV of SHIMAZU Corporation was used as the CT scanner. The thickness of the positive electrode corresponds to the dimension Tc in FIG. 2. The thickness of the negative electrode corresponds to the dimension Ta in FIG. 2.

The packing density Dc of the manganese dioxide was determined from the following formula.

Packing density $Dc$ of manganese dioxide=Weight of manganese dioxide in positive electrode/Volume of positive electrode The volume of the positive electrode was calculated from the outer diameter, inner diameter, and height of the positive electrode. As the outer and inner diameters of the positive electrode, the values used to determine the thickness Tc of the positive electrode were used. The height of the positive electrode was obtained by taking an X-ray radiograph of the battery. At this time, the height of the positive electrode was defined as the length from the upper face of the positive electrode to the lower face of the positive electrode in the axial direction of the battery.

The weight of manganese dioxide in the positive electrode was determined by the following method.

The battery was disassembled, and all the positive electrode was taken out from the battery and sufficiently dissolved in an acid. The undissolved matter was filtrated out to obtain a sample solution. The content of manganese (Mn) in the sample solution was determined by ICP emission spectrometry (high frequency inductively coupled plasma emission spectroscopy). The content was converted to the amount of manganese dioxide ($MnO_2$), and the converted value was used as the weight of manganese dioxide in the positive electrode.

The packing density Da of the zinc alloy was determined from the following formula.

Packing density of zinc alloy=Weight of zinc alloy in negative electrode/Volume of negative electrode The volume of the negative electrode was calculated from the outer diameter, inner diameter, and height of the negative electrode. As the outer and inner diameters of the negative electrode, the values used to determine the thickness Ta of the negative electrode were used. The height of the negative electrode was obtained by taking an X-ray radiograph of the battery. At this time, the height of the negative electrode was defined as the length from the upper face of the negative electrode to the lower face of the negative electrode in the axial direction of the battery. The position of the upper face of the negative electrode was defined as the midpoint position between the highest point and the lowest point of the upper face. The position of the lower face of the negative electrode was defined as the midpoint position between the highest point and the lowest point of the lower face.

The weight of the zinc alloy in the negative electrode was determined by the following method.

The battery was disassembled, and all the negative electrode in the battery was taken out. The water-soluble substances and gelling agent were removed by decantation using water as a solvent. The resulting material was sufficiently dried to collect the zinc alloy, and the weight thereof was used as the weight of the zinc alloy in the negative electrode.

The batteries produced in the above manner were subjected to the following discharge test.

[Evaluation]

(1) High-Load Discharge Test

In an environment of 20±2° C., a 2-second discharge at 1.5 W and a 28-second discharge at 0.65 W were alternately repeated 10 times to perform a pulse discharge, which was followed by a 55-minute interval. This cycle was repeated until the closed circuit voltage of the battery reached 1.05 V. The total number of times the 1.5 W discharge and the 0.65 W discharge were alternately repeated until the closed circuit voltage of the battery reached 1.05 V was obtained as the number of pulses.

(2) Low-Load Discharge Test

In an environment of 20° C.±2° C., a 4-hour discharge at 43Ω and a subsequent 4-hour interval were repeated to perform an intermittent discharge until the closed circuit voltage reached 0.9 V. The total time of discharge at 43Ω until the closed circuit voltage reached 0.9 V was obtained as the discharge time.

Of each of the combinations Nos. 1 to 9 of the packing densities of the positive and negative electrodes, the battery with the best high-load discharge performance was selected. Table 10 shows the results.

TABLE 10

| Combination No. of packing densities of positive and negative electrodes | Battery No. | Packing density Dc of manganese dioxide (g/cm³) | Packing density Da of zinc alloy (g/cm³) | Thickness Tc of positive electrode (mm) | Thickness Ta of negative electrode (mm) | Tc/Ta (Actually measured value) | Dc/Da (Actually measured value) | Number of pulses in low-load discharge |
|---|---|---|---|---|---|---|---|---|
| 1 | A6 | 2.80 | 2.00 | 2.43 | 3.45 | 0.705 | 1.398 | 140 |
| 2 | B5 | 2.80 | 2.30 | 2.53 | 3.35 | 0.757 | 1.216 | 135 |
| 3 | C6 | 3.00 | 2.30 | 2.43 | 3.45 | 0.705 | 1.304 | 131 |
| 4 | D7 | 3.00 | 2.00 | 2.33 | 3.56 | 0.656 | 1.499 | 136 |
| 5 | E6 | 2.90 | 2.15 | 2.43 | 3.45 | 0.705 | 1.351 | 136 |
| 6 | F8 | 2.85 | 2.08 | 2.23 | 3.40 | 0.658 | 1.372 | 141 |
| 7 | G6 | 2.95 | 2.23 | 2.43 | 3.30 | 0.737 | 1.324 | 134 |
| 8 | H7 | 2.85 | 2.23 | 2.33 | 3.13 | 0.745 | 1.277 | 140 |
| 9 | I8 | 2.95 | 2.08 | 2.23 | 3.25 | 0.688 | 1.419 | 140 |

Figure 3:
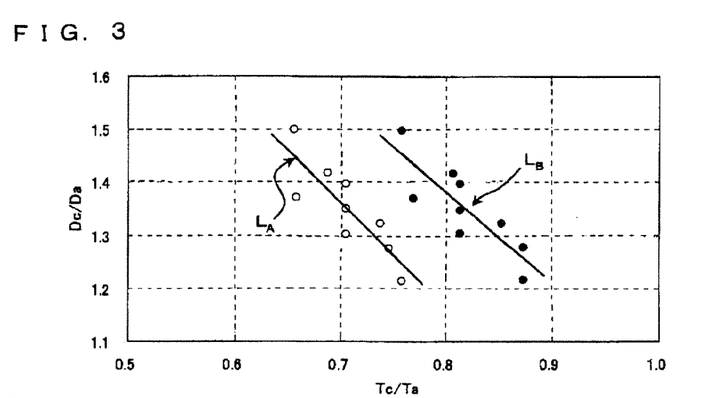
FIG. 3 is a graph showing the relation between the ratio Dc/Da of the packing densities of the positive and negative electrodes and the ratio Tc/Ta of the thicknesses of the positive and negative electrodes in the radial direction in Examples of the invention.

In Table 10, the correlation between Dc/Da and Tc/Ta was examined. As a result, it was found that there was a correlation of a linear regression line represented by the formula (4) below. The multiple correlation coefficient of this regression line was 0.85. The white circles in FIG. 3 represent the respective values in Table 10, and the straight line $L_A$ in FIG. 3 represents the regression line represented by the formula (4). The straight line $L_A$ was obtained by regression analysis using the Microsoft spread sheet program "Microsoft Office Excel".

$$Dc/Da = -1.975 \times (Tc/Ta) + 2.745 \quad (4)$$

Of each of the combinations Nos. 1 to 9 of the packing densities of the positive and negative electrodes, the battery with the best low-load discharge performance was selected. Table 11 shows the results.

TABLE 11

| Combination No. of packing densities of positive and negative electrodes | Battery No. | Packing density Dc of manganese dioxide (g/cm³) | Packing density Da of zinc alloy (g/cm³) | Thickness Tc of positive electrode (mm) | Thickness Ta of negative electrode (mm) | Tc/Ta (Actually measured value) | Dc/Da (Actually measured value) | Number of pulses in low-load discharge |
|---|---|---|---|---|---|---|---|---|
| 1 | A4 | 2.80 | 2.00 | 2.63 | 3.24 | 0.813 | 1.398 | 104 |
| 2 | B3 | 2.80 | 2.30 | 2.73 | 3.13 | 0.873 | 1.217 | 106 |

TABLE 11-continued

| Combination No. of packing densities of positive and negative electrodes | Battery No. | Packing density Dc of manganese dioxide (g/cm$^3$) | Packing density Da of zinc alloy (g/cm$^3$) | Thickness Tc of positive electrode (mm) | Thickness Ta of negative electrode (mm) | Tc/Ta (Actually measured value) | Dc/Da (Actually measured value) | Number of pulses in low-load discharge |
|---|---|---|---|---|---|---|---|---|
| 3 | C4 | 3.00 | 2.30 | 2.63 | 3.24 | 0.813 | 1.305 | 108 |
| 4 | D5 | 3.00 | 2.00 | 2.53 | 3.35 | 0.757 | 1.498 | 106 |
| 5 | E4 | 2.90 | 2.15 | 2.63 | 3.24 | 0.813 | 1.349 | 106 |
| 6 | F6 | 2.85 | 2.08 | 2.43 | 3.17 | 0.768 | 1.370 | 102 |
| 7 | G4 | 2.95 | 2.23 | 2.63 | 3.09 | 0.852 | 1.323 | 107 |
| 8 | H5 | 2.85 | 2.23 | 2.53 | 2.90 | 0.873 | 1.279 | 103 |
| 9 | I6 | 2.95 | 2.08 | 2.43 | 3.02 | 0.806 | 1.418 | 103 |

In Table 11, the correlation between Dc/Da and Tc/Ta was examined. As a result, it was found that there was a correlation of a linear regression line represented by the formula (5) below. The multiple correlation coefficient of this regression line was 0.84. The black circles in FIG. 3 represent the respective values in Table 11, and the straight line $L_B$ in FIG. 3 represents the regression line represented by the formula (5). The straight line $L_B$ was obtained by regression analysis using the Microsoft spread sheet program "Microsoft Office Excel".

$$Dc/Da = -1.690 \times (Tc/Ta) + 2.734 \quad (5)$$

When Dc/Da and Tc/Ta are between the straight line $L_A$ represented by the formula (4) and the straight line $L_B$ represented by the formula (5) in FIG. 3, that is, when they satisfy the above formula (1), good discharge performance could be obtained both in low-load discharge and high-load discharge. Specifically, the discharge time in the low-load discharge test was 95 hours or more, and the number of pulses in the high-load discharge test was 120 or more. When Dc/Da and Tc/Ta satisfy the formula (1), in FIG. 3, the closer to the straight line $L_A$ Dc/Da and Tc/Ta are, the higher the high-load discharge performance is. The closer to the straight line $L_B$, the higher the low-load discharge performance is. On the side close to the straight line $L_A$, the number of pulses in the high-load discharge test was 130 or more. On the side close to the straight line $L_B$, the discharge time in the low-load discharge test was 100 hours or more.

Figure 4:
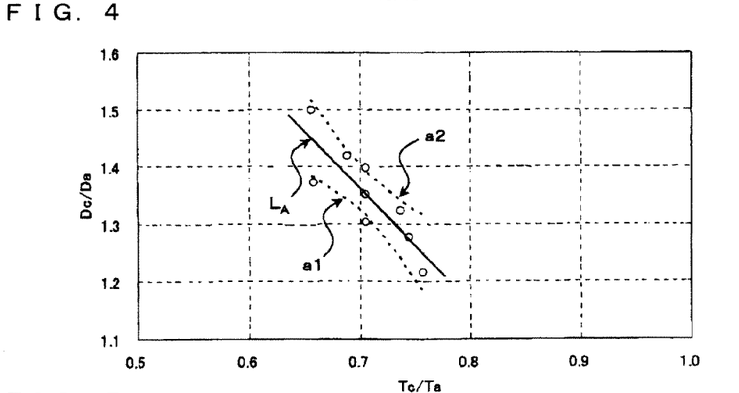
FIG. 4 is a graph showing a 95% confidence interval for the regression line $L_A$ in FIG. 3.

FIG. 4 shows the straight line $L_A$ in FIG. 3 and a 95% confidence interval therefor. When Dc/Da and Tc/Ta are within the region (between two broken lines in FIG. 4) corresponding to the 95% confidence interval for the straight line $L_A$ in FIG. 4, i.e., when they satisfy the formula (2), good high-load discharge performance could be obtained. Specifically, the number of pulses in the high-load discharge test was 130 or more. A 95% confidence interval refers to an indicator commonly used in regression analysis. The formula (2) means that the lower limit of the 95% confidence interval (broken line a1 in FIG. 4)<Dc/Da<the upper limit of the 95% confidence interval (broken line a2 in FIG. 4). When Dc/Da and Tc/Ta satisfy the formula (2), in FIG. 4, the closer to the straight line $L_A$ Dc/Da and Tc/Ta are, the higher the high-load discharge performance is.

Figure 5:
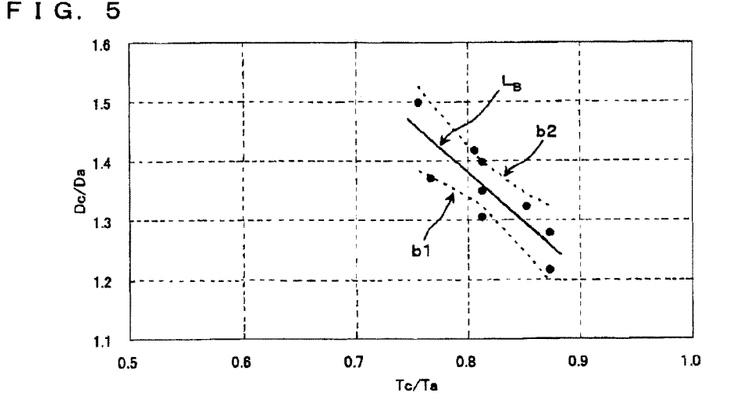
FIG. 5 is a graph showing a 95% confidence interval for the regression line $L_B$ in FIG. 3.

FIG. 5 shows the straight line $L_B$ in FIG. 3 and a 95% confidence interval therefor. When Dc/Da and Tc/Ta are within the region (between two broken lines in FIG. 5) corresponding to the 95% confidence interval for the straight line $L_B$ in FIG. 5, i.e., when they satisfy the formula (3), good low-load discharge performance could be obtained. Specifically, the discharge time in the low-load discharge test was 100 hours or more.

The formula (3) means that the lower limit of the 95% confidence interval (broken line b1 in FIG. 5)<Dc/Da<the upper limit of the 95% confidence interval (broken line b2 in FIG. 5). When Dc/Da and Tc/Ta satisfy the formula (3), in FIG. 5, the closer to the straight line $L_B$ Dc/Da and Tc/Ta are, the higher the low-load discharge performance is.

The 95% confidence interval was determined by using the Microsoft spread sheet program "Microsoft Office Excel". More specifically, the 95% confidence interval was determined by using the formula: (Dc/Da values obtained from the regression formula)±t×standard error S. The regression formula is the above formula (4) or (5). t is 2.3646. This value is the value when the level of significance is 5% at t distribution with a degree of freedom of 7. In the data in Tables 10 and 11, the degree of freedom is 7.

The standard error S was determined by using the formula: $[Ve \times \{(1/n)+(X/Y)\}]^{1/2}$. Ve represents the error variance, n represents the number of data, X represents the square number of deviation of Tc/Ta value, and Y represents the square sum of deviations of all the data of Tc/Ta. Specifically, in Table 2, Ve=0.00223, n=9, X=(Tc/Ta−0.70603)$^2$, and Y=0.01027. In Table 3, Ve=0.00228, n=9, X=(Tc/Ta−0.81871)$^2$, and Y=0.01359.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

INDUSTRIAL APPLICABILITY

The cylindrical alkaline battery of the invention having good discharge performance can be used advantageously as the power source for electronic devices such as portable appliances.

The invention claimed is:
1. A cylindrical alkaline battery comprising:
a cylindrical battery case with a bottom;
a cylindrical positive electrode contained in the battery case, the positive electrode having a hollow and including manganese dioxide and graphite;
a negative electrode packed in the hollow of the positive electrode, the negative electrode including zinc or a zinc alloy;
a separator interposed between the positive electrode and the negative electrode;

a negative electrode current collector rod inserted into the negative electrode; and an alkaline electrolyte, wherein:

the packing density Dc of the manganese dioxide in the positive electrode is 2.8 to 3 g/cm$^3$, the packing density Da of the zinc or zinc alloy in the negative electrode is 2 to 2.3 g/cm$^3$, and the packing density Dc of the manganese dioxide, the packing density Da of the zinc or zinc alloy, the thickness Tc of the positive electrode in a radial direction, and the thickness Ta of the negative electrode in a radial direction satisfy the following relational formula:

$$-11.652 \times (Tc/Ta)^2 + 14.470 \times (Tc/Ta) - 3.095 < Dc/Da < 8.895 \times (Tc/Ta)^2 - 16.244 \times (Tc/Ta) + 8.726,$$

where $0.656 \leq Tc/Ta \leq 0.873$.

2. The cylindrical alkaline battery in accordance with claim 1, wherein the content of the graphite in the positive electrode is 3 to 10 parts by weight per 100 parts by weight of the manganese dioxide.

3. The cylindrical alkaline battery in accordance with claim 1, wherein the zinc or zinc alloy contains 25 to 38% by weight of particles with a particle size of 75 μm or less.

4. The cylindrical alkaline battery in accordance with claim 1, wherein the potential of the manganese dioxide in a potassium hydroxide aqueous solution of 20° C. having a concentration of 40% by weight is 290 to 350 mV relative to a Hg/HgO mercury oxide reference electrode.

5. The cylindrical alkaline battery in accordance with claim 4, wherein the potential of the manganese dioxide in the potassium hydroxide aqueous solution of 20° C. having the concentration of 40% by weight is 300 to 325 mV relative to the Hg/HgO mercury oxide reference electrode.

6. The cylindrical alkaline battery in accordance with claim 1, wherein the ratio P1/P2 of the mean particle size P1 of the manganese dioxide to the mean particle size P2 of the graphite is from 3.5 to 5.5.

7. The cylindrical alkaline battery in accordance with claim 1, wherein the zinc or zinc alloy contains 50% by weight or more of particles with an aspect ratio of from 2 to 5.

8. The cylindrical alkaline battery in accordance with claim 1, wherein the thickness of the cylindrical portion of the battery case is 0.15 to 0.2 mm.

9. The cylindrical alkaline battery in accordance with claim 1, wherein the alkaline electrolyte is a potassium hydroxide aqueous solution having a concentration of 30 to 35% by weight.

10. The cylindrical alkaline battery in accordance with claim 1, wherein the alkaline electrolyte is a potassium hydroxide aqueous solution having a concentration of 33 to 38% by weight.

11. The cylindrical alkaline battery in accordance with claim 1, wherein the packing density Dc of the manganese dioxide in the positive electrode is 2.85 to 2.95 g/cm$^3$, and the packing density Da of the zinc or zinc alloy in the negative electrode is 2.05 to 2.25 g/cm$^3$.

12. The cylindrical alkaline battery in accordance with claim 1, wherein the packing density Dc of the manganese dioxide in the positive electrode is 2.85 to 2.95 g/cm$^3$, and the packing density Da of the zinc or zinc alloy in the negative electrode is 2.1 to 2.2 g/cm$^3$.

\* \* \* \* \*